(12) United States Patent
Namari

(10) Patent No.: US 6,595,044 B2
(45) Date of Patent: Jul. 22, 2003

(54) STROKE DISCRIMINATOR FOR AN INTERNAL COMBUSTION ENGINE

(75) Inventor: Takashi Namari, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/918,574

(22) Filed: Aug. 1, 2001

(65) Prior Publication Data

US 2002/0026825 A1 Mar. 7, 2002

(30) Foreign Application Priority Data

Sep. 1, 2000 (JP) .......................................... 2000-265502

(51) Int. Cl.$^7$ ............................................. G01M 15/00
(52) U.S. Cl. ......................................................... 73/116
(58) Field of Search .............................. 73/116, 118.1; 123/400, 612, 617

(56) References Cited

U.S. PATENT DOCUMENTS 6,035,826 A * 3/2000 Matsuoka .............. 123/406.82

* cited by examiner

*Primary Examiner*—Eric S. McCall
*Assistant Examiner*—Monica D. Harrison
(74) *Attorney, Agent, or Firm*—Arent Fox Kintner Plotkin & Kahn, PLLC

(57) ABSTRACT

The invention provides a stroke discriminator of an internal combustion engine which can quickly identify the stroke of the internal combustion engine. A rotor operatively associated with a crankshaft of a single cylinder internal combustion engine is provided on the outer periphery thereof with a plurality of detected elements. The rotor is provided, on the outer periphery thereof, with a detected element formed-region having a plurality of detected elements formed thereon at equal angle intervals in the rotational direction and a non-formed region having no detected elements formed thereon. The non-formed region has an angle interval greater than the equal angle interval, and provided on the rotor to pass near detector means when the piston of the internal combustion engine travels from the top dead center to the bottom dead center.

3 Claims, 11 Drawing Sheets

STROKE DISCRIMINATOR FOR AN INTERNAL COMBUSTION ENGINE

BACKGROUND OF THE INVENTION

1. Field of the Invention

The present invention relates to stroke discrimination of a single-cylinder internal combustion engine.

2. Description of the Related Art

An apparatus for discriminating the stroke of internal combustion engines is disclosed in Japanese Patent Kokai No. 61-89959. The apparatus discriminates engine strokes using two detection signals transmitted by two crank angle sensors, respectively, which are provided near the crankshaft.

Conventional apparatuses require two crank angle sensors and there has been no other choice but to use a complicated structure to utilize the two sensors. In addition, two detection signals are required to discriminate engine strokes, and therefore the apparatuses present a drawback in that it takes a long processing time to discriminate the engine stroke.

SUMMARY OF THE INVENTION

The present invention was developed in view of the aforementioned problems in the prior art. It is therefore an object of the present invention to provide an apparatus having a simple configuration for discriminating the stroke of an internal combustion engine to determine the stroke of the internal combustion engine.

A stroke discriminator of an internal combustion engine according to the present invention comprises a rotor operatively associated with a crankshaft of a single cylinder internal combustion engine and provided with a plurality of detected elements thereon. The stroke discriminator also comprises detector means for transmitting a detection signal every time said detected elements pass nearby and discriminator means for determining a stroke of the internal combustion engine in accordance with a difference in time between a transmission of a previous detection signal and a transmission of a current detection signal. The stroke discriminator is characterized in that an outer periphery of said rotor has a detected-element region having said plurality of detected elements formed thereon at equal angle intervals in a direction of rotation and a region which does not have detected elements formed thereon. The stroke discriminator is also characterized in that said region without the elements has an angle interval greater than said equal angle interval, and said region without the elements is provided on said rotor so as to pass near said detector means when a piston of said internal combustion engine travels from the top dead center to the bottom dead center.

That is, according to the feature of the present invention, it is possible to identify the stroke of an internal combustion engine in a short time with a simple configuration.

DETAILED DESCRIPTION OF THE PREFERRED EMBODIMENTS

The present invention will be described below with reference to the accompanying drawings in accordance with the embodiments.

Figure 1:
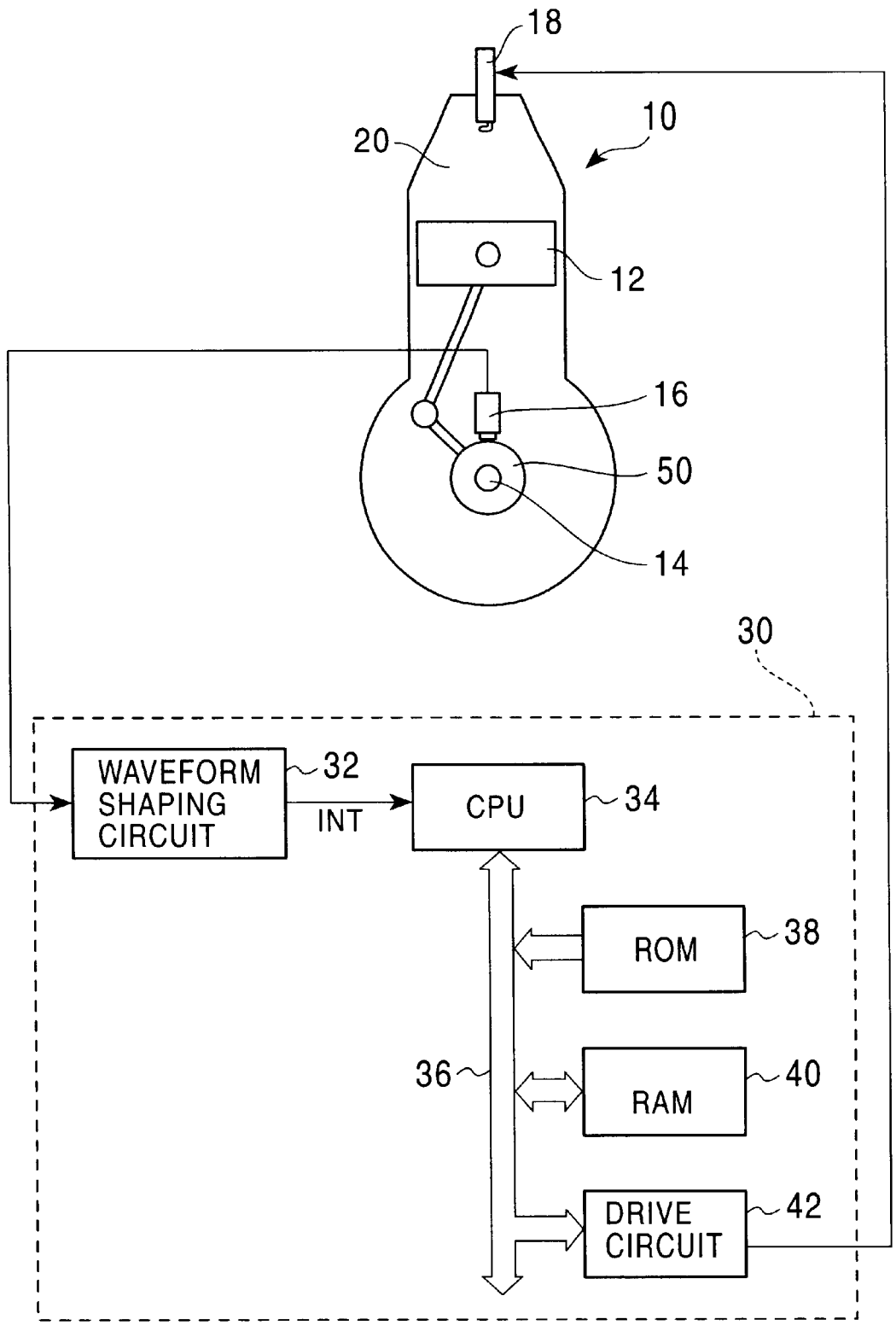
FIG. 1 is a block diagram illustrating the configuration of an internal combustion engine and the control portion of the internal combustion engine.

As shown in FIG. 1, a single cylinder internal combustion engine 10 receives a mixture of intake gas drawn from an intake pipe (not shown) and fuel injected from a fuel injection unit (not shown) into a combustion chamber 20. Then, the internal combustion engine 10 allows the introduced gas mixture to be burned and thereby reciprocate a piston 12 for rotatably driving a crankshaft 14. The burned gas mixture in the combustion chamber 20 is exhausted as an exhaust gas through an exhaust pipe (not shown).

The crankshaft 14 is provided with a rotor 50. As described later, on the periphery of the rotor 50, there is provided a plurality of elements for detection, i.e., a plurality of magnetic projections (not shown). A crank angle sensor 16 is located near the rotational locus of the magnetic projections. At predetermined crank angles, for example, at every 20 degrees of the crank angle, the crank angle sensor 16 transmits a detection signal indicative of the detection of a magnetic projection in response to a change in magnetic flux created by the magnetic projections.

The detection signal transmitted from the crank angle sensor 16 is supplied to a waveform shaping circuit 32 of an electronic control unit (hereinafter referred to as the ECU), which shapes the detection signal into a pulse signal of pulse trains. The output terminal of the waveform shaping circuit 32 is connected to an interrupt input terminal of a central processing unit (hereinafter referred to as the CPU), while the pulse signal transmitted from the waveform shaping circuit 32 is supplied to the CPU 34. As described above, every time a magnetic projection passes near the crank angle sensor 16, the pulse transmitted from the crank angle sensor 16 is supplied to the CPU 34, and the CPU 34 executes an interrupt processing every time the CPU detects a pulse. With such a configuration, the CPU 34 can execute a predetermined processing at each predetermined angle of the crankshaft.

The CPU 34 is connected with an input/output bus 36, which is adapted to receive from and output to the CPU 34 a data signal or an address signal. The input/output bus 36 is connected with a ROM (Read Only memory) 38, a RAM (Random Access Memory) 40, and a drive circuit 42. The drive circuit 42 is connected to an ignition plug 18. Transmitting an ignition command from the CPU 34 to the drive circuit 42 causes the drive circuit 42 to supply a drive current to the ignition or spark plug 18. Supplying a drive current to the spark plug 18 will cause the spark plug 18 to spark. The spark ignites the gas mixture introduced into the combustion chamber 20, and the combustion of the gas mixture initiates the expansion stroke of the internal combustion engine. The aforementioned ROM 38 stores a program for determining the stroke of the internal combustion engine in accordance with the flowcharts, described later, shown in FIG. 3, FIG. 7, and FIG. 9 through FIG. 11. On the other hand, the RAM 40 stores the variables of a program or the values of flags, to be described later.

Figure 2:
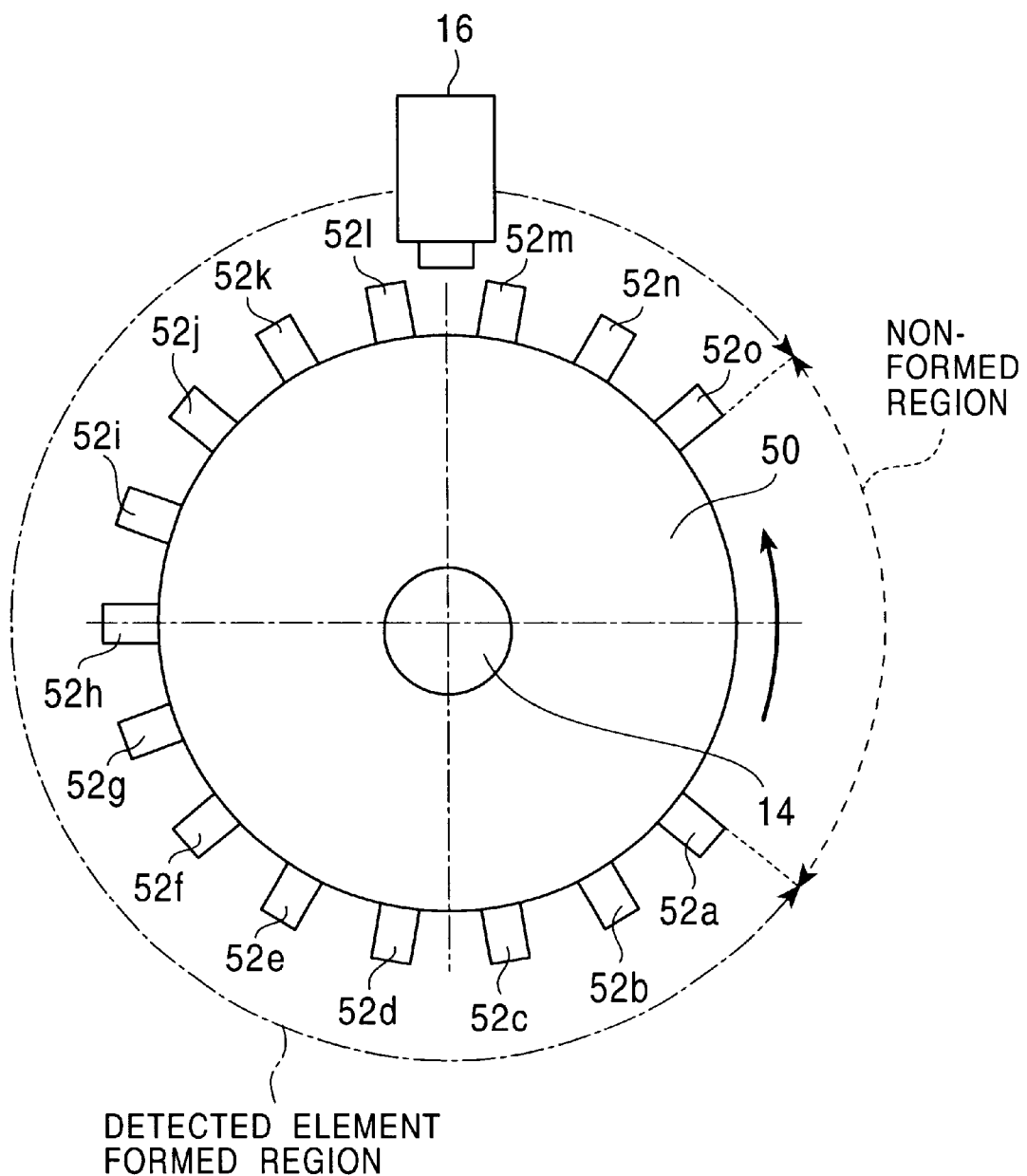
FIG. 2 is a schematic view illustrating the arrangement of magnetic projections formed on the periphery of the rotor operatively associated with the crankshaft according to an embodiment of the present invention.

FIG. 2 shows the arrangement of a plurality of magnetic projections, which are formed on the outer periphery of the rotor 50. Incidentally, FIG. 2 shows the arrangement of the magnetic projections provided when the piston 12 of the internal combustion engine 10 has reached the top dead center position. The arrangement of the magnetic projections given when the piston 12 has reached the bottom dead center position can be obtained by being rotated by 180 degrees about the crankshaft 14.

As shown in FIG. 2, the disc-shaped rotor 50 is provided on the crankshaft 14 to be operatively associated with the rotational motion of the crankshaft 14. As shown by the arrow in the figure, a counterclockwise rotation of the crankshaft 14 will cause the rotor 50 to rotate in the counterclockwise direction. On the outer periphery of the rotor 50, there is provided a plurality of detected elements, e.g., magnetic projections 52a–52o at predetermined equal angles, for example, at every 20 degrees. In addition, for example, the neighboring magnetic projections 52a and 52o are at an angle of 80 degrees, which is greater than the aforementioned equal angle interval.

The crank angle sensor 16 is located near the rotation locus of the magnetic projections 52a–52o. Every time the magnetic projections 52a–52o pass near the crank angle sensor 16, the crank angle sensor 16 transmits a detection signal indicative of the detection of a magnetic projection in response to a change in magnetic flux established by the magnetic projection.

Hereinafter referred to as a detected-element formed region is the region where the magnetic projections are formed at equal angle interval, that is, the region of the outer periphery of the rotor 50 where the magnetic projections 52a–52o are formed, as indicated by an alternate long and short dashed line of FIG. 2. Hereinafter termed a non-formed region is the region where no magnetic projections are formed at an angle interval greater than the equal angle interval. This region is between the neighboring magnetic projections 52a and 52o, as indicated by a dashed line of FIG. 2.

As shown in FIG. 2, the magnetic projections 52a and 52o are provided on the rotor 50 so that the two magnetic projections 52a and 52o pass near the crank angle sensor 16 while the piston 12 of the internal combustion engine 10 is moving from the top dead center to the bottom dead center. With this arrangement, while the piston 12 of the internal combustion engine 10 is moving from the top dead center to the bottom dead center, all the non-formed regions sandwiched by the two magnetic projections 52a and 52o will pass near the crank angle sensor 16. The stroke of the internal combustion engine, during which the piston 12 moves from the top dead center to the bottom dead center, is either the expansion stroke or the intake stroke. In the configuration described above, the stroke of the internal combustion engine, during which all the non-formed regions pass near the crank angle sensor 16, is either the expansion stroke or the intake stroke.

Furthermore, when the piston 12 has reached near the top dead center, the gas mixture introduced into the combustion chamber 20 of the internal combustion engine 10 is ignited. Thus, the piston 12 has maximum speed when the piston 12 is positioned near the middle point between the top dead center and bottom dead center while the piston 12 travels from the top dead center to the bottom dead center. At this time, the rotational speeds of the crankshaft and the rotor 50 operatively associated therewith move at maximum speed. The piston 12 is energized during the expansion stroke. This makes the speed at which the non-formed region passes near the crank angle sensor 16 in the expansion stroke greater than that at which the non-formed region passes near the crank angle sensor 16 in the intake stroke.

The detector means comprise the aforementioned crank angle sensor 16, the determination means and the means for determining the expansion stroke comprise an ECU 30, and a plurality of detected elements comprise the magnetic projections 52a–52o.

In the following explanations, it is assumed that the ECU 30 has been activated and is in steady operation after having completed activation processing such as initialization of variables to be used in the CPU 34. It is also assumed that the timer, to be described later, is activated at the same time as the start-up of the internal combustion engine.

Figure 3:
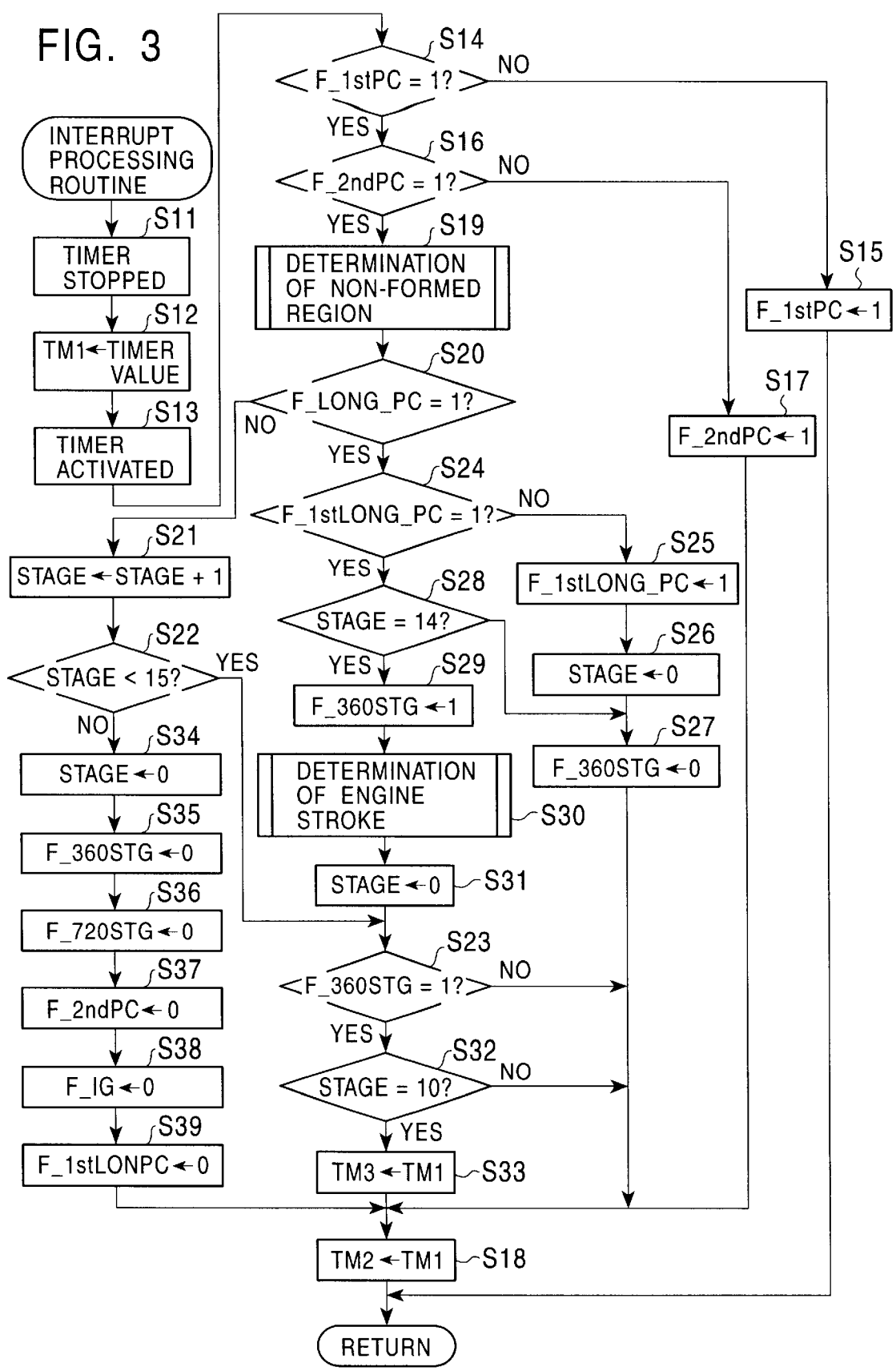
FIG. 3 is a flowchart illustrating the subroutine to be executed in the interrupt processing when the pulse of a detection signal transmitted from a crank angle sensor is detected.
Figure 4:
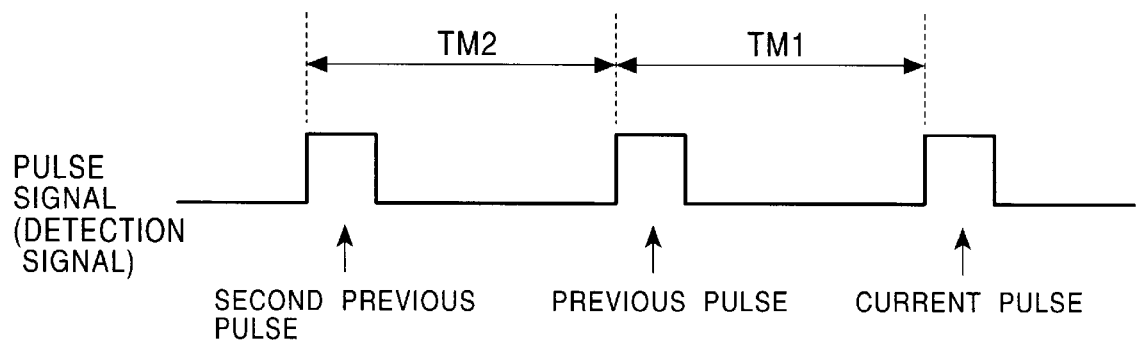
FIG. 4 is a time chart illustrating the pulse of a detection signal and elapse times TM1 and TM2.
Figure 5:
FIG. 5 is a time chart illustrating the relationship between changes in a pulse signal, a magnetic projection, a non-formed region, a stage number, the stroke of an internal combustion engine, and the negative pressure of an intake pipe.

As described above, when the CPU 34 has detected the pulse of a pulse signal that has been transmitted from the crank angle sensor 16 and shaped by the waveform shaping circuit 32, the CPU 34 performs the interrupt processing. The flowchart illustrating the subroutine to be executed in this interrupt processing is shown in FIG. 3. This flowchart will be described in conjunction with the examples of the time charts shown in FIG. 4 and FIG. 5. As described later, FIG. 4 is a time chart showing the elapse times TM1 and TM2, while FIG. 5 illustrates the pulse signal supplied from the waveform shaping circuit 32 to the CPU 34, and the symbols of magnetic projections each corresponding to the respective pulses are shown near each pulse. Furthermore, the stage number to be defined by executing the routine of FIG. 3 is indicated near each corresponding pulse.

As shown in FIG. 5, when the pulse $P_1$ transmitted for the first time after the internal combustion engine has been started is detected and the subroutine shown in FIG. 3 has been initialized for execution, the pre-started timer is stopped (step S11). Then, the timer is read to substitute the resulting timer value into the variable TM1 (step S12), and actuates the timer (step S13). The timer is started, stopped, and read at such timing. As shown in FIG. 4, the elapse time TM1 is thereby adapted to indicate the elapse time from the rising part of the previously detected pulse (hereinafter referred to as the previous pulse) to the rising part of the currently detected pulse (hereinafter referred to as the current pulse). The value of the elapse time TM1 is given when detected is the pulse $P_1$ transmitted for the first time after the internal combustion engine has been started. The elapse time TM1 is to indicate the elapse time from the point of time the timer has been activated by the start-up of the internal combustion engine to the time of detection of the pulse $P_1$. In addition, as shown in FIG. 4, the elapse time TM2, to be described later, is to indicate the elapse time from the rising part of the second previously detected pulse (hereinafter referred to as a second previous pulse) to the rising part of the previous pulse.

Then, it is determined whether the value of flag F__1stPC is one (step S14). This flag F__1stPC is indicative of whether the pulse $P_1$ transmitted for the first time since the internal combustion engine has been started is detected. The flag F__1stPC takes on a value of one when the first pulse $P_1$ has been detected, while the flag F__1stPC assumes a value of zero when the first pulse $P_1$ has not yet been detected.

Suppose that the pulse $P_1$ transmitted for the first time since the internal combustion engine has been started is detected to execute this subroutine. In this case, since the value zero of the flag F__1stPC remains unchanged, it is determined in step S14 that the flag F__1stPC does not have a value of one. Then, since the currently detected pulse $P_1$ is the first one, the flag F__1stPC is set to a value of one (step S15), and then this subroutine is terminated.

Then, as shown in FIG. 5, suppose that the pulse $P_2$ transmitted for the second time since the internal combustion engine 10 has been started is detected to execute this subroutine. In this case, the processing of the aforementioned steps S11 through S13 is performed. Thereafter, in step S14, since the first pulse $P_1$ has been detected, it is determined that the flag F__1stPC has a value of one and whether the flag F__2ndPC has a value of one (step S16). This flag F__2ndPC is indicative of whether the pulse $P_2$ transmitted for the second time since the internal combustion engine has been started is detected. The flag F__2ndPC takes on a value of one when the second pulse $P_2$ has been detected, while the flag F__2ndPC assumes a value of zero when the second pulse $P_2$ has not yet been detected. At this time, since the second pulse $P_2$ has just been detected and the flag F__2ndPC remains with the initial value, it is determined that the flag F__2ndPC does not have a value of one. Then, since the currently detected pulse is the second pulse $P_2$, the flag F__2ndPC is set a value of one (step S17) and then the value of the elapse time TM1 is substituted into the elapse time TM2 (step S18), and thereafter this subroutine is terminated. In step S18 mentioned above, the value of the elapse time TM1 is substituted into the elapse time TM2. As shown in FIG. 4, the elapse time TM1 thereby indicates the elapse time from the detection of the rising part of the previous pulse to the detection of the rising part of the current pulse when pulses subsequent to the pulse $P_2$, shown in FIG. 5, are detected to execute this subroutine. On the other hand, the elapse time TM2 indicates the elapse time from the detection of the rising part of the second previous pulse to the detection of the rising part of the previous pulse. With the aforementioned configuration, it is possible to obtain the difference in time between the time at which one of two neighboring detected elements or magnetic projections passes near the crank angle sensor 16 or the detector means and the time at which the other of the two magnetic projections passes near the crank angle sensor 16.

When a pulse $P_3$ transmitted for the third time since the internal combustion engine 10 has been started is detected to execute this subroutine, the flag F__1stPC and the flag F__2ndPC have a value of one. Thus, the processing from steps S11 through S14 is performed and thereafter the subroutine for determining a non-formed region, described later, is performed to determine whether the non-formed region has been detected (step S19).

Then, it is determined whether flag F__LONG__PC has a value of one (step S20). This flag F__LONG__PC is indicative of whether the non-formed region has been detected. The flag F__LONG__PC takes on a value of zero when the non-formed region has not previously been detected and a value of one when the non-formed region has previously been detected. At the point of time at which the pulse $P_3$ is detected, since the non-formed region has not yet been detected, it is determined that the flag F__LONG__PC does not have a value of one, and then the variable STAGE is added by one (step S21). Since the value of the variable STAGE has been initialized, the variable STAGE takes on one at the time the pulse $P_3$ is detected.

Then, it is determined whether the variable STAGE has a value of less than 15 (step S22). As described above, since the variable STAGE has a value of one at the point of time the pulse $P_3$ is detected, it is determined that the variable STAGE has a value of less than 15 and then it is determined whether the flag F__360STG has a value of one (step S23). The flag F__360STG is indicative of whether the stage number has been identified. The flag F__360STG takes on a value of zero when the stage number has not yet been identified, while the flag F__360STG takes on a value of one when the stage number has been already identified. Since the stage number has not yet been identified at the point of time the pulse $P_3$ has been detected, it is determined that the flag F__360STG does not have a value of one, and then the processing of step S18 is performed to terminate this subroutine.

Then, when the pulse $P_4$ transmitted for the fourth time since the internal combustion engine 10 has been started is detected to execute this subroutine, executed is the processing of the aforementioned steps S11, S12, S13, S16, S19, S20, S21, S22, S23, and S18, in that order.

When the pulse $P_5$ transmitted for the fifth time since the internal combustion engine 10 has been started is detected to execute this subroutine, executed is the processing of the aforementioned steps S11 through S13, and S16. Thereafter, since the non-formed region has been previously detected, the flag F__LONG__PC is set a value of one (step S47, described later) in the subroutine for determining a non-formed region of step S19. In step S20, this allows it to be determined that the flag F__LONG__PC has a value of one and whether the flag F__1stLONG__PC has a value of one (step S24). The flag F__1stLONG__PC is indicative of whether the first non-formed region has been detected since the internal combustion engine 10 has been started. The flag has a value of zero when the first non-formed region has not yet been detected and value of one when the first non-formed region has already been detected. At the point of time the pulse $P_5$ is detected, it is determined that the flag F__1stLONG__PC has a value of zero. Then, the flag F__1stLONG__PC is set to a value of one (step S25), the variable STAGE is set to zero (step S26), the flag F__360STG is set to a value of zero (step S27), the processing of step S18 is performed, and then this subroutine is terminated.

Subsequently, when the pulses $P_6$ through $P_{19}$ shown in FIG. 5 are detected to execute this subroutine, the processing of the aforementioned steps S11 through S13 and S16 is performed. Then, since the non-formed region has not yet been previously detected, the flag F__LONG__PC is set again to a value of zero (step S42, described later) in the subroutine for determining a non-formed region of step S19. This allows it to be determined that the flag F__LONG__PC does not have a value of one in step S20, and then the processing of the aforementioned steps S21 through S23 and S18 is performed. Incidentally, the stage number is increased by one every time the aforementioned processing of step S21 is performed. This causes the stage number to be one upon detection of pulse $P_6$, the stage number to be two upon detection of pulse $P_7$, and the stage number to be three upon detection of pulse $P_8$. In this manner, the stage number is increased by one to cause the stage number to be 14 upon detection of pulse $P_{19}$.

Then, suppose that the pulse $P_{20}$ shown in FIG. 5 is detected to execute this subroutine. In this case, since the non-formed region has been previously detected, the processing of the aforementioned steps S11 through S13 and S16 is performed, and then the flag F_LONG_PC is set again to a value of one (step S47, described later) in the subroutine for determining a non-formed region of step S19. Accordingly, in step S20, it is determined that the flag F_LONG_PC has a value of one and whether the flag F_1stLONG_PC has a value of one (step S24). Since the flag F_1stLONG_PC is set to a value of one in the aforementioned step S25, it is determined in step S24 that the flag F_1stLONG_PC has a value of one and whether the variable STAGE has a value of 14 (step S28). As described above, since the stage number is 14 upon detection of the pulse, it is determined that the variable STAGE has a value of 14 in step S28, and then the flag F_360STG is set to a value of one (step S29). The processing of step S29 identifies the stage number. Incidentally, when it has been determined in the aforementioned step S28 that the variable STAGE does not have a value of 14, the processing proceeds to step S27 to set the flag F_360STG to a value of one. This processing is to prevent malfunctioning in detecting a pulse signal containing noise even when it has been accidentally determined by detecting the noise component that a magnetic projection has passed.

After the processing of step S29 has been performed, the processing for determining an engine stroke, to be described later, is performed (step S30). Then, the variable STAGE is set to zero (step S31), and then it is determined whether the flag F_360STG has a value of one (step S23). Since the flag F_360STG is set to a value of one in the aforementioned step S29, it is determined that the flag F_360STG has a value of one and then it is determined whether the variable STAGE has a value of 10 (step S32). Since the variable STAGE is set to a value of zero in the aforementioned step S31, it is determined that the variable STAGE does not have a value of 10 and then the processing proceeds to step S18 to terminate this subroutine. Then, when the pulses $P_{21}$ through $P_{28}$ shown in FIG. 5 are detected to execute this subroutine, executed is the processing of the aforementioned steps S11, S12, S13, S14, S16, S19, S20, S21, S22, S23, S32, and S18, in that order. In this case, since the stage number is incremented by one in the aforementioned steps S21, the stage number is one upon detection of pulse $P_{21}$, the stage number is two upon detection of pulse $P_{22}$ the stage number is three upon detection of pulse $P_{23}$, and thus the stage number is 9 upon detection of pulse $P_{29}$.

Then, when the pulse $P_{30}$ shown in FIG. 5 is detected to execute this subroutine, processing of the aforementioned steps S11, S12, S13, S14, S16, S19, S20, S21, S22, S23, and S32, is executed in that order. Since the variable STAGE takes on a value of 10 in step S21 of this processing, it is determined in step S32 that the variable STAGE has a value of 10, the value of TM1 is substituted into a variable TM3 (step S33), the processing of step S18 is performed, and then this subroutine is terminated. Since the aforementioned step S33 is executed only when the variable STAGE has a value of 10, the variable TM3 indicates the elapse time from the detection of the rising part of a magnetic projection $52k$ to the detection of the rising part of the magnetic projection $52l$.

In addition, with the aforementioned arrangement, the variable STAGE never has a value of 15 or greater. In step S22, it is determined whether the variable STAGE is greater than 15. This is performed to prevent malfunctioning in detecting a pulse signal containing noise even when it has been accidentally determined by detecting the noise component that a magnetic projection has passed. When it has been determined in step S22 that the variable STAGE is greater than 15, the variable is reset (step S34 through S39), and then the processing proceeds to step S18.

Suppose that pulses subsequent to the pulse $P_{31}$ shown in FIG. 5, are detected to execute this subroutine. When it is determined that the stage number is 10, executed is the processing of steps S11, S12, S13, S14, S16, S19, S20, S21, S22, S23, S32, S33, and S18, in that order. When it is determined that the stage number is not 10, executed is the processing of steps S11, S12, S13, S14, S16, S19, S20, S21, S22, S23, S32, and S18, in that order. When it is determined that the flag F_LONG_PC has a value of one, processing of steps S11, S12, S13, S14, S16, S19, S20, S24, S28, S29, S30, S31, S23, S32, S33, and S18, is executed in that order.

Figure 6A:
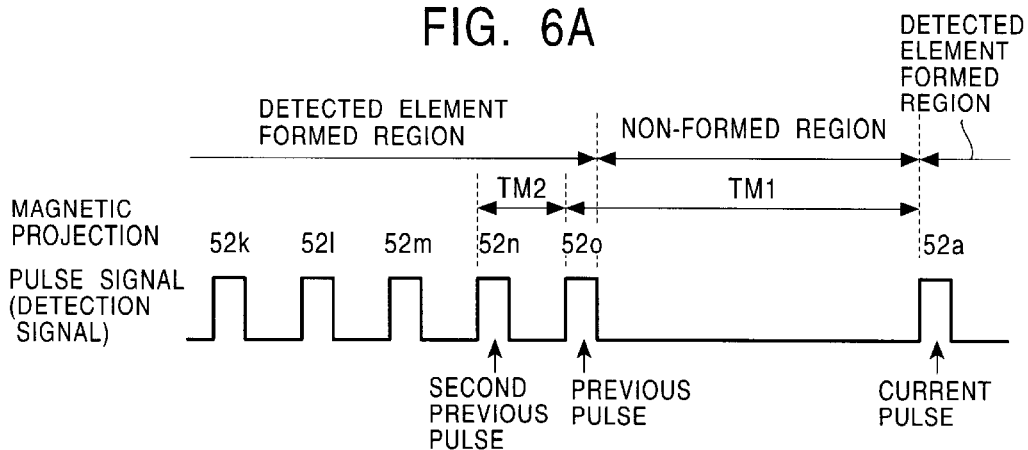
FIGS. 6A through 6C are time charts illustrating the relationship between elapse times TM1 and TM2, and detected-element formed and non-formed regions.
Figure 6B:
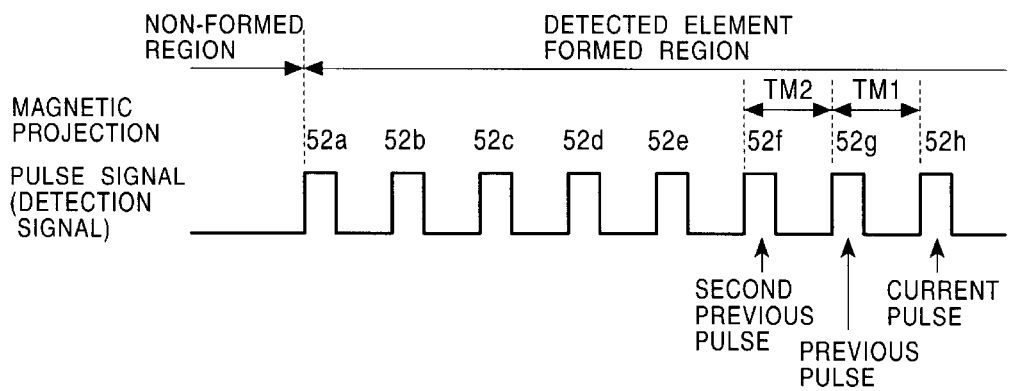
Figure 6C:
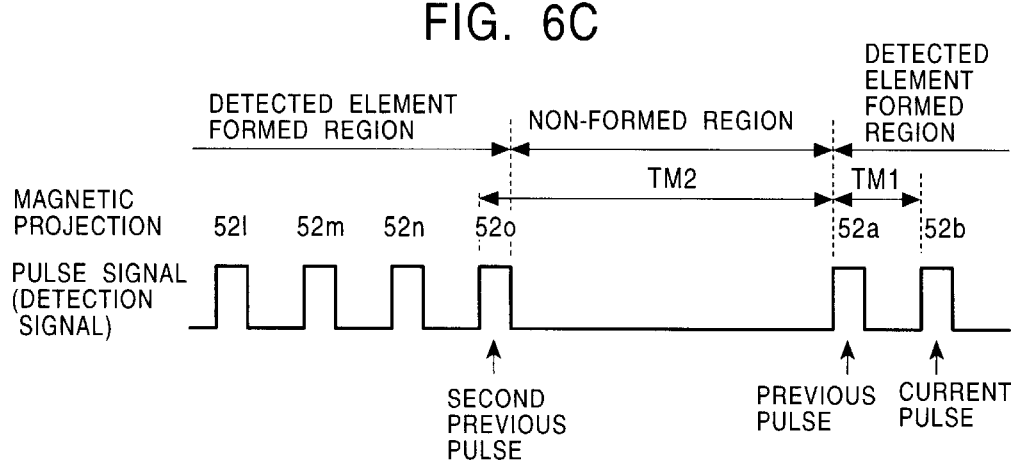

FIGS. 6A through 6C are time charts illustrating the relationship between the aforementioned elapse times TM1 and TM2, and detected-element formed and non-formed regions.

The non-formed region corresponding to a period between the previous pulse and the current pulse is the basis for the time chart as shown in FIG. 6A. Referring to FIG. 6A, the current pulse is transmitted upon detection of the magnetic projection $52a$, the previous pulse is transmitted upon detection of the magnetic projection $52o$, and the second previous pulse is transmitted upon detection of the magnetic projection $52n$. Since FIG. 6A shows the case where the non-formed region corresponds to between the previous pulse and the current pulse, the elapse time TM1 is greater than the elapse time TM2, and thus the ratio of the elapse time TM2 to the elapse time TM1 is less than one.

FIG. 6B is a time chart illustrating an example in which the detected-element formed region corresponds to both a period between the second previous pulse and the previous pulse and between the previous pulse and the current pulse. In the example of FIG. 6B, the current pulse is transmitted upon detection of the magnetic projection $52h$, the previous pulse is transmitted upon detection of the magnetic projection $52g$, and the second previous pulse is transmitted upon detection of the magnetic projection $52f$. In the case of the example of FIG. 6B, with the crankshaft of the internal combustion engine rotating at a constant rotational speed, the elapse time TM1 is generally equal to the elapse time TM2, and thus the ratio of the elapse time TM2 to the elapse time TM1 is approximately one.

Furthermore, FIG. 6C is a time chart illustrating the case in which the non-formed region corresponds to the second previous pulse and the previous pulse. In the case of FIG. 6C, the current pulse is transmitted upon detection of the magnetic projection $52b$, the previous pulse is transmitted upon detection of the magnetic projection $52a$, and the second previous pulse is transmitted upon detection of the magnetic projection $52o$. In this case, the elapse time TM1 is less than the elapse time TM2, and the ratio of the elapse time TM2 to the elapse time TM1 is greater than one.

Figure 7:
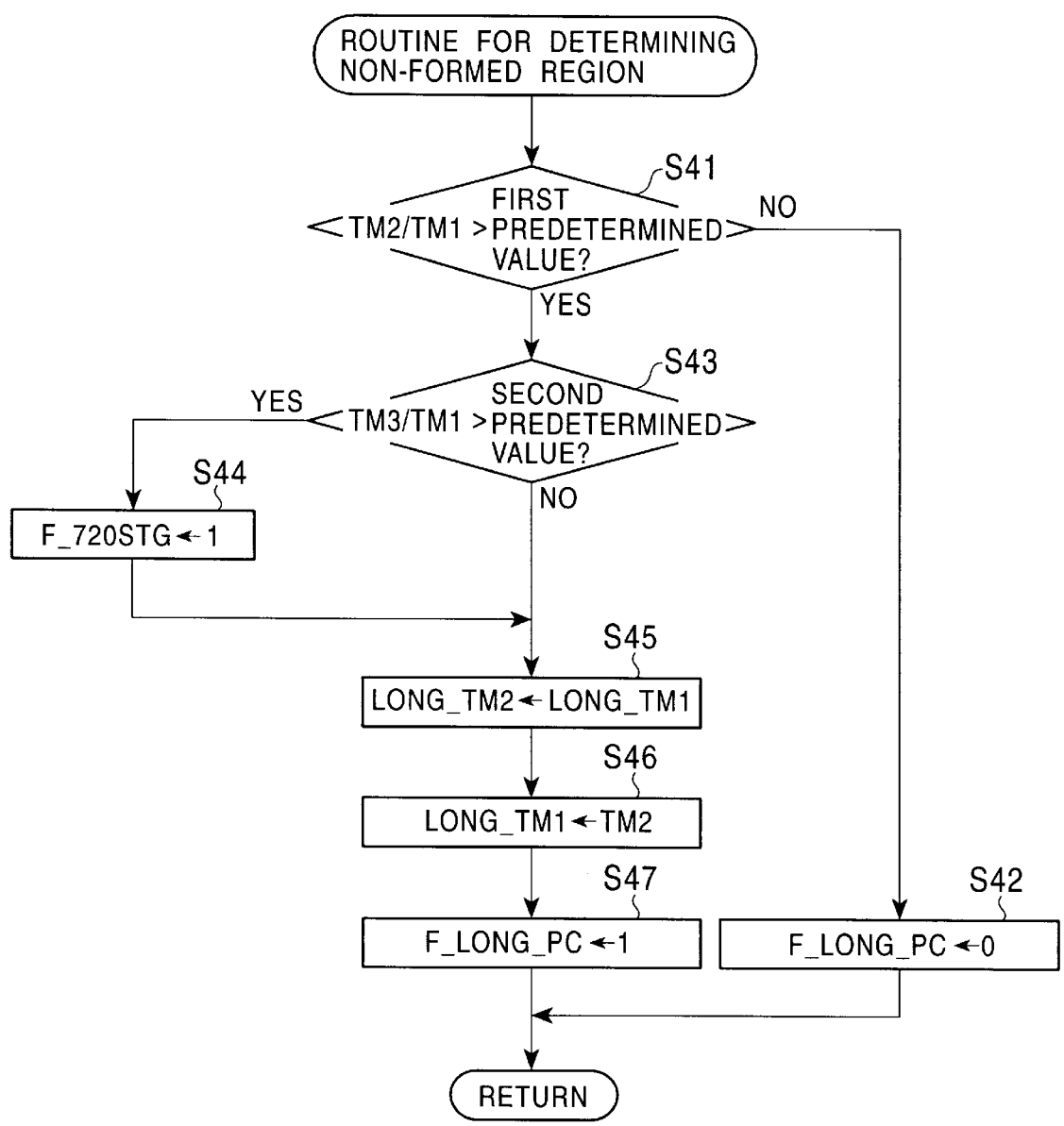
FIG. 7 is a flowchart illustrating a subroutine for determining a non-formed region to be executed in step S19 of the interrupt processing routine shown in FIG. 3.

FIG. 7 is a flowchart illustrating a subroutine for determining a non-formed region to be executed in step S19 of the aforementioned flowchart shown in FIG. 3.

When this subroutine is called and executed in step S19 of FIG. 3, it is determined whether the ratio of the elapse time TM2 to the elapse time TM1 is greater than the fist predetermined value (step S41).

Suppose that the non-formed region cannot be detected during the time from the detection of the second previous pulse to the detection of the previous pulse (as shown in FIGS. 6A and 6B in the foregoing). In this case, it is determined in the aforementioned step S41 that the ratio of the elapse time TM2 to the elapse time TM1 is equal to or less than the first predetermined value. This first predetermined value, for example, taking a value of 2.5, is pre-determined in consideration of the angle interval between neighboring magnetic projections in the detected-element formed region, the angle interval formed by the non-formed region, and variations in rotational speed of the crankshaft of the internal combustion engine 10. After the processing of step S41 has been performed, the flag F_LONG_PC is set to a value of zero (step S42), and then this subroutine is terminated. As mentioned above, the flag F_LONG_PC is indicative of whether the non-formed region corresponds to between the second previous pulse and the previous pulse. The flag has a value of zero for the non-formed region that does not correspond to between the second previous pulse and the previous pulse, whereas the flag has a value of one for the non-formed region that does correspond to the period between the second previous pulse and the previous pulse.

Suppose that the non-formed region is detected during the time from the detection of the second previous pulse to the detection of the previous pulse (as shown in FIG. 6C in the foregoing). In this case, it is determined in the aforementioned step S41 that the ratio of the elapse time TM2 to the elapse time TM1 is greater than the first predetermined value. Then, it is determined that the ratio of the elapse time TM3 to the elapse time TM1 is greater than a second predetermined value (step S43). In steps S32 and S33 of the aforementioned flowchart of FIG. 3, the elapse time TM3 is given when it is determined that the stage number is 10. Accordingly, the elapse time TM3 is indicative of the elapse time from the detection of the rising part of the magnetic projection 52$k$ to the detection of the rising part of the magnetic projection 52$l$. In addition, as shown in FIG. 5, the magnetic projections 52$k$, 52$l$ are detected in either the compression stroke or the exhaust stroke, and thus the elapse time TM3 indicates an elapse time in either the compression stroke or the exhaust stroke. On the other hand, in the aforementioned step S41, the elapse time TM1 is given when it is determined that the non-formed region is detected during the time from the detection of the second previous pulse to the detection of the previous pulse. Accordingly, as shown in FIG. 6C, the elapse time TM1 is indicative of the elapse time from the detection of the rising part of the magnetic projection 52$a$ to the detection of the rising part of the magnetic projection 52$b$. The magnetic projections 52$a$ and 52$b$ are detected in either the expansion stroke or the intake stroke as shown in FIG. 5. Thus, the elapse time TM1 indicates the elapse time in either the expansion stroke or the intake stroke. With the aforementioned arrangement, the elapse time TM3 in the compression stroke corresponds to the elapse time TM1 in the expansion stroke, whereas the elapse time TM3 in the exhaust stroke corresponds to the elapse time TM1 in the intake stroke.

When the elapse time TM3 corresponds to the compression stroke and the elapse time TM1 corresponds to the expansion stroke, the rotational motion of the crankshaft is accelerated in the combustion stroke to cause the value of the timer to become shorter. Thus, the elapse time TM1 becomes less than the elapse time TM3, and accordingly the ratio of the elapse time TM3 to the elapse time TM1 is greater than one. On the other hand, when the elapse time TM3 corresponds to the exhaust stroke and the elapse time TM1 corresponds to the intake stroke, the elapse time TM1 becomes approximately equal to the elapse time TM3, and thus the ratio of the elapse time TM3 to the elapse time TM1 becomes approximately one.

Suppose that, in the aforementioned step S43, it is determined that the ratio of the elapse time TM3 to the elapse time TM1 is greater than the second predetermined value. In this case, it is possible to determine that the stroke of the internal combustion engine is in the combustion stroke, and then the flag F_720STG is set a value of one (step S44). The aforementioned second predetermined value, for example, taking a value of 1.5, is pre-determined in consideration of the angle interval between neighboring magnetic projections in the detected-element formed region and variations in rotational speed of the crankshaft of the internal combustion engine 10. Then, a variable LONG_TM1 is substituted into a variable LONG_TM2 (step S45), the variable TM1 is substituted into the variable LONG_TM1 (step S46), the flag F_LONG_PC is set to a value of one (step S47), and then this subroutine is terminated.

When it has been determined in the aforementioned step S43 that the ratio of the elapse time TM3 to the elapse time TM1 is equal to or less than the second predetermined value, the processing of the aforementioned steps S45 through S47 is performed and then this subroutine is terminated.

Furthermore, in the aforementioned embodiment, the elapse time TM3 is the difference in time between the detection of the rising part of the magnetic projection 52$k$ and the detection of the rising part of the magnetic projection 52$l$. That is, the difference in time between the two points of detection of neighboring magnetic projections is employed as the elapse time TM3. However, the difference in time between the two points of two magnetic projections provided at non-neighboring positions may be employed as the elapse time TM3. That is, suppose, at a point in time, detected is the rising part of one of any two magnetic projections of the magnetic projections 52$d$ through 52$l$ that pass near the crank angle sensor 16 when the piston travels from the bottom dead center to the top dead center. The difference between this point in time and the time of detection of the rising part of the other magnetic projection may be employed as the elapse time TM3. For example, the difference in time between the times of the detection of the rising part of the magnetic projection 52$i$ and the detection of the rising part of the magnetic projection 52$l$ may be employed as the elapse time TM3. Alternatively, the difference in time between the times of the detection of the rising part of the magnetic projection 52$j$ and the detection of the rising part of the magnetic projection 52$k$ may be employed as the elapse time TM3. Incidentally, in this case, the second predetermined value in the aforementioned step S43 is also changed to a predetermined value in accordance with the elapse time TM3.

Moreover, in the aforementioned step S41 of FIG. 7, it was determined that the non-formed region had been detected by determining that the ratio of the elapse time TM2 to the elapse time TM1 was greater than the first predetermined value. However, it may also be acceptable to determine that the non-formed region has been detected by determining that the ratio of the elapse time TM2 to the elapse time TM1 is less than a predetermined value. In this case, as shown in FIG. 6A, it holds that the non-formed region exists during the time of detection of the previous pulse to the detection of the current pulse.

Figure 8:
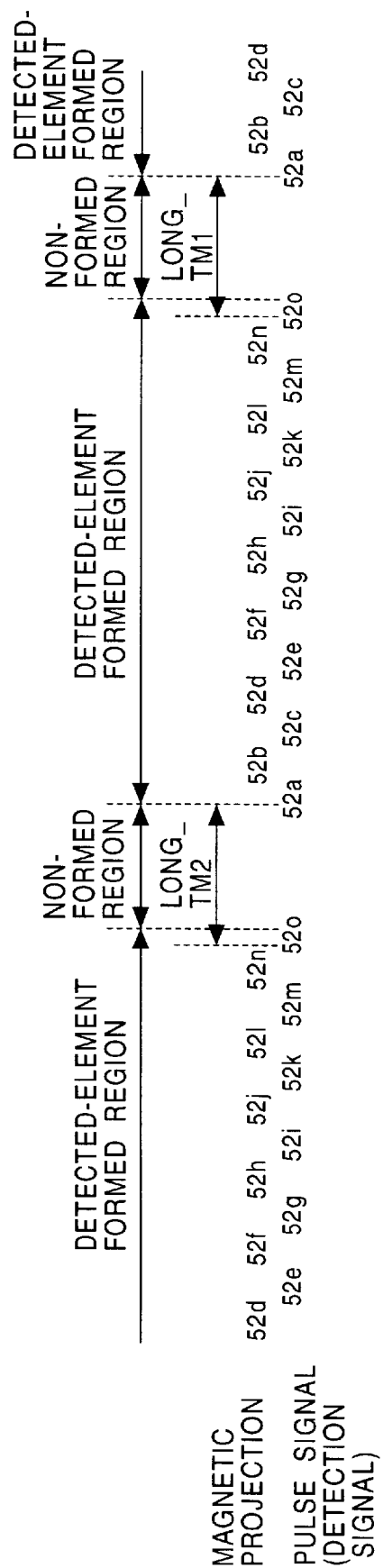
FIG. 8 is a time chart illustrating the relationship between a previously detected non-formed region and a currently detected non-formed region.

As shown in FIG. 8, the aforementioned variable LONG_TM1 is indicative of the elapse time from the current detection of the magnetic projection 52o to the current detection of the magnetic projection 52a. Further, the variable LONG_TM1 is indicative of the time corresponding to the time at which the non-formed region has currently passed near the crank angle sensor 16. Thus, the variable LONG_TM1 is referred to as the current non-formed-region passing time. On the other hand, the variable LONG_TM2 is indicative of the elapse time from the previous detection of the magnetic projection 52o to the previous detection of the magnetic projection 52a. Further, the variable LONG_TM2 is indicative of the time corresponding to the time at which the non-formed region has previously passed near the crank angle sensor 16. Thus, the variable LONG_TM2 is referred to as the previous non-formed-region passing time.

Figure 9:
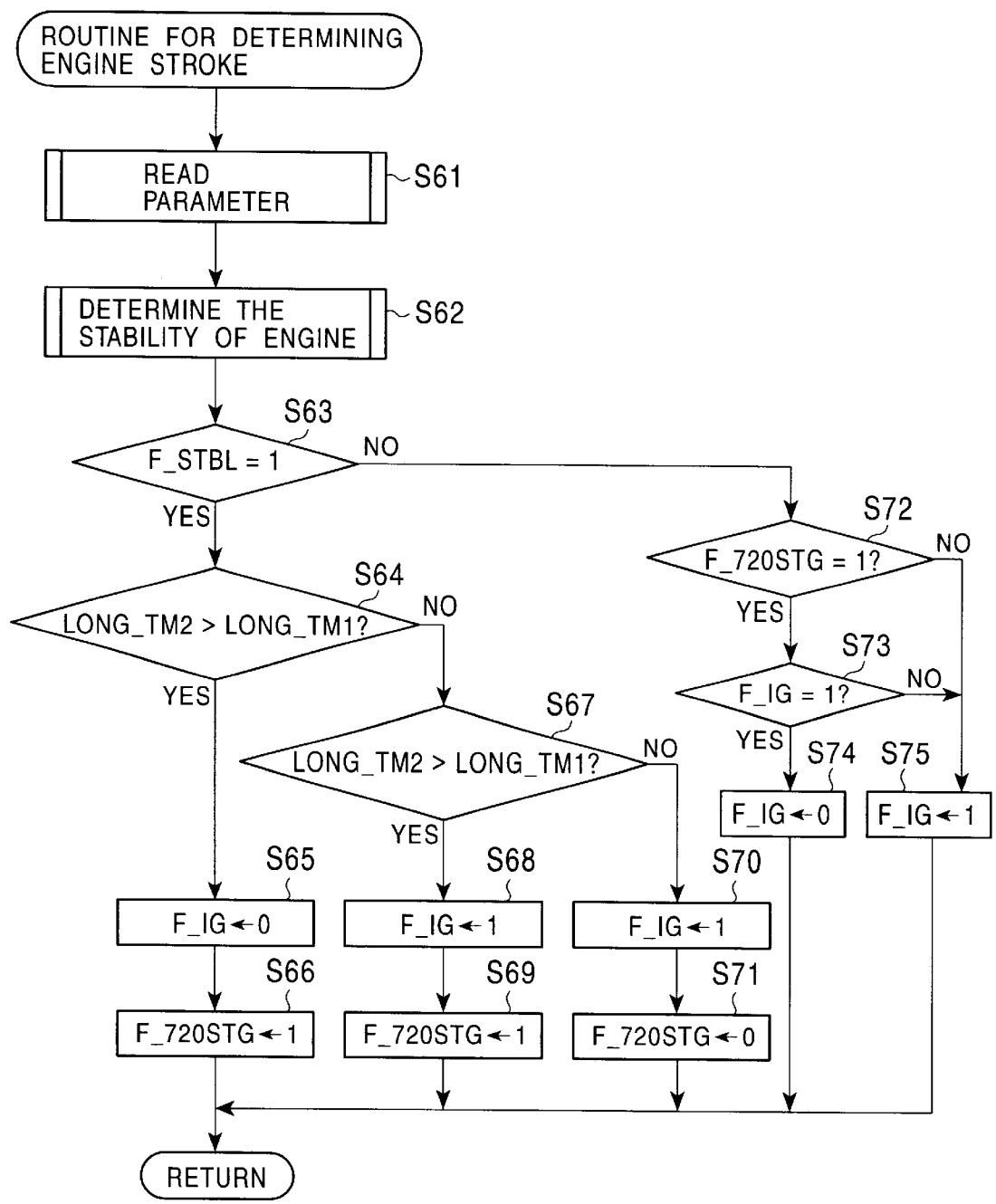
FIG. 9 is a flowchart illustrating a subroutine for determining an engine stroke to be executed in step S30 of the interrupt processing routine shown in FIG. 3.

FIG. 9 is a flowchart illustrating the subroutine for determining the stroke of the internal combustion engine to be executed in the aforementioned step S30 of FIG. 3.

Figure 10:
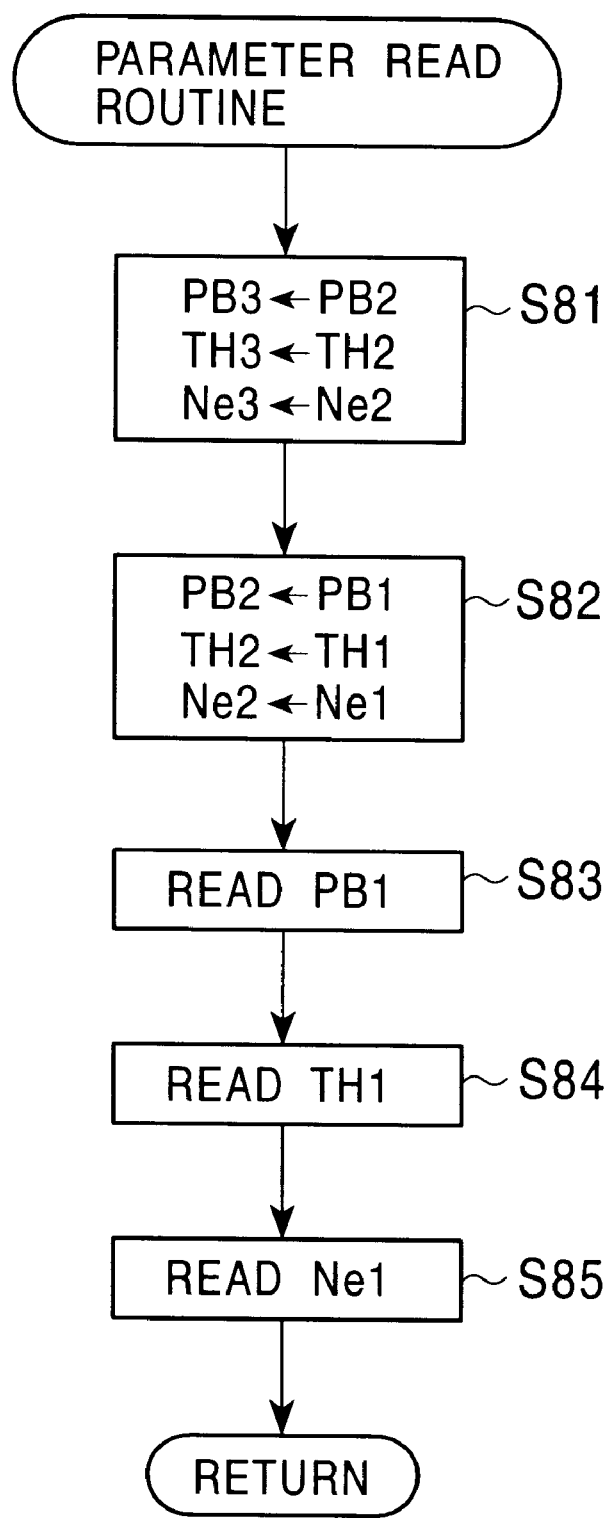
FIG. 10 is a flowchart illustrating a subroutine for reading a parameter to be executed in step S61 of the subroutine for determining an engine stroke shown in FIG. 9.

First, the parameter read routine, described later, shown in FIG. 10 is executed to read parameters (step S61), and then executed is the routine for determining the stability of an internal combustion engine, described later, shown in FIG. 11 (step S62). Then, it is determined whether the flag F_STBL has a value of one (step S63). This flag F_STBL is indicative of whether the internal combustion engine provides stable operation. As described later, the flag F_STBL has a value of one when it is determined that the internal combustion engine operates with stability, whereas the flag F_STBL has a value of zero when it has been determined that the internal combustion engine is not stable in operation.

When it has been determined in step S63 that the flag F_STBL has a value of one, it is determined whether the aforementioned variable LONG_TM1 is less than the variable LONG_TM2 (step S64). Suppose that it has been determined that the variable LONG_TM1 is less than the variable LONG_TM2, or it has been determined that the current non-formed-region passing time is shorter than the previous non-formed-region passing time. In this case, the flag F_IG is set to a value of zero (step S65), the flag F_720STG is set to a value of one (step S66), and then this subroutine is terminated. The flag F_IG is indicative of the permission of ignition. The flag F_IG takes on a value of one when it is determined that an ignition is to be produced in the current stroke, while the flag F_IG takes on a value of zero when no ignition is to be produced in the current stroke.

When it has been determined in the aforementioned step S64 that the variable LONG_TM1 is equal to or greater than the variable LONG_TM2, it is determined whether the variable LONG_TM1 is greater than the variable LONG_TM2 (step S67). When it has been determined that the variable LONG_TM1 is greater than the variable LONG_TM2, the flag F_IG is set to a value of one (step S68), the flag F_720STG is set to a value of one (step S69), and then this subroutine is terminated. On the other hand, when it has been determined in step S67 that the variable LONG_TM1 is equal to or less than the variable LONG_TM2, the flag F_IG is set to a value of one (step S70), the flag F_720STG is set to a value of zero (step S71), and then this subroutine is terminated.

The aforementioned magnetic projections 52o, 52a, shown in FIG. 8, form two neighboring detected elements which sandwich the non-formed region, the magnetic projection 52o forming one detected element and the magnetic projection 52a forming the other. In addition, the difference between the time at which the magnetic projection 52o passes near the crank angle sensor 16 or the detector means and the time at which the magnetic projection 52a passes near the crank angle sensor 16 or the detector means. The difference between the times at which these magnetic projections have passed previously near the crank angle sensor 16 is employed as the previous non-formed-region passing time LONG_TM2. The difference between the times at which these magnetic projections have passed currently near the crank angle sensor 16 is employed as the current non-formed-region passing time LONG_TM1. When this current non-formed-region passing time LONG_TM1 is less than the previous non-formed-region passing time LONG_TM2, it is determined that the stroke of the internal combustion engine is in the combustion stroke.

When it has been determined in the aforementioned step S63 that the flag F_STBL does not have a value of one, it is determined whether the flag F_720STG has a value of one (step S72). When it has been determined that the flag F_720STG has a value of one, it is determined whether the flag F_IG has a value of one (step S73). When it has been determined that the flag F_IG has a value of one, the flag F_IG is set to a value of zero (step S74). When it has been determined that the flag F_IG does not have a value of one, the flag F_IG is set to one (step S75) and then this subroutine is terminated.

On the other hand, when it has been determined in the aforementioned step S72 that the flag F_720STG does not have a value of one, the flag F_IG is set to a value of one (step S75) and then this subroutine is terminated.

For an internal combustion engine with a single cylinder, the expansion stroke requires less time than for the intake stroke. As described with reference to FIG. 2, the non-formed region is so provided on the rotor 50 as to correspond to the expansion stroke or the intake stroke. This makes the elapse time over the non-formed region in the expansion stroke shorter than that in the intake stroke. In the aforementioned steps S64 or S67, this makes it possible to determine, when it has been determined that the current non-formed-region passing time is shorter than the previous non-formed-region passing time, that the current stroke is the expansion stroke and the previous stroke is the intake stroke. On the other hand, when the current non-formed-region passing time is determined to be longer than the previous non-formed-region passing time, it can be determined that the current stroke is the intake stroke and the previous stroke is the expansion stroke.

FIG. 10 is a flowchart illustrating a subroutine for reading a parameter to be executed in the aforementioned step S61 of FIG. 9.

First, the value of PB2 is substituted into a variable PB3, the value of TH2 is substituted into a variable TH3, and the value of Ne2 is substituted into a variable Ne3 (step S81) The aforementioned PB3 is indicative of the value of the negative pressure of the intake pipe that has been detected second previously. The PB2 is indicative of the negative pressure of the intake pipe that has been detected previously. The TH3 is indicative of the value of the opening level of the throttle valve that has been detected second previously. The TH2 is indicative of the value of the opening level of the throttle valve that has been detected previously. The Ne3 is indicative of the value of the rotational speed of the internal combustion engine that has been detected second previously. The Ne2 is indicative of the value of the rotational speed of the internal combustion engine that has been detected previously.

Then, the value of PB1 is substituted into the variable PB2, the value of TH1 is substituted into the variable TH2, and the value of Ne1 is substituted into the variable Ne2 (step S82). The PB1 is indicative of the value of the negative pressure of the intake pipe that has been detected currently. The TH1 is indicative of the value of the opening level of the throttle valve that has been detected currently. The Ne1 is indicative of the value of the rotational speed of the internal combustion engine that is detected currently.

Then, as new current values, the value of the negative pressure of the intake pipe is detected and substituted into the PB1 (step S83) and the value of the opening level of the throttle valve is detected and substituted into the TH1 (step S84). In addition, the value of the rotational speed of the internal combustion engine is detected and substituted into the Ne1 (step S85) and then this subroutine is terminated. As shown in FIG. 5, the aforementioned negative pressure of the intake pipe varies in accordance with the cycle of the internal combustion engine. As described later, the negative pressure of the intake pipe is detected to determine the stability of the internal combustion engine.

Figure 11:
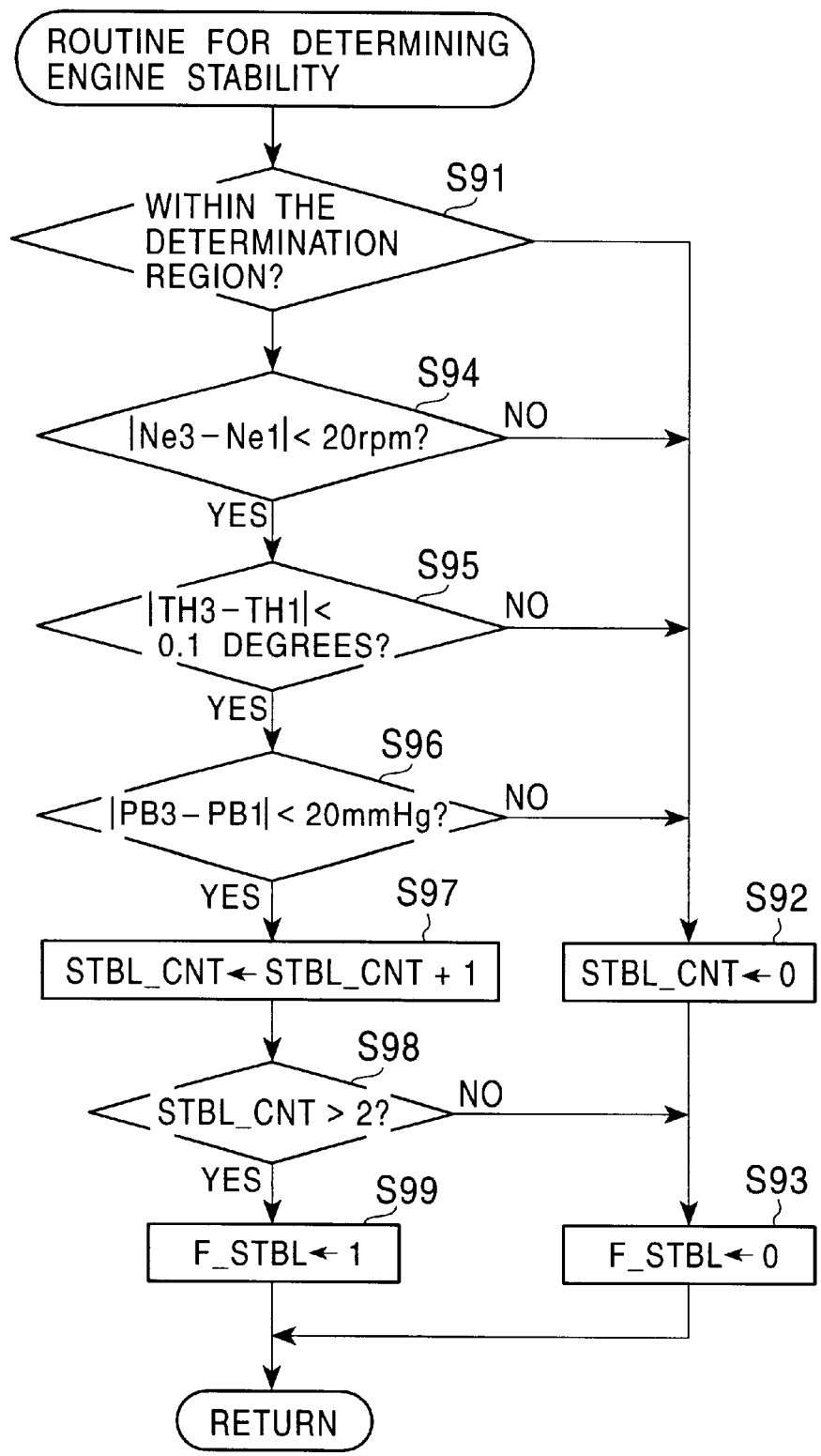
FIG. 11 is a flowchart illustrating a subroutine for determining the stability of an internal combustion engine to be executed in step S62 of the subroutine for determining an engine stroke shown in FIG. 9.

FIG. 11 is a flowchart illustrating a subroutine for determining the stability of an internal combustion engine to be executed in the aforementioned step S62 of FIG. 9.

First, it is determined whether the values of the rotational speed of the engine, the opening level of the throttle valve, and the negative pressure of the intake pipe are included within the predetermined range (step S91). When it has been determined that these parameters are not included within the predetermined range, the variable STBL_CNT is set to a value of zero (step S92), the flag F_STBL is set to a value of zero (step S93), and this subroutine is terminated. The variable STBL_CNT is indicative of the number of times at which it has been determined in this subroutine that the internal combustion engine is stable. The flag F_STBL is indicative of whether it has been determined that the internal combustion engine is stable. When it has been determined that the internal combustion engine is stable, the flag F_STBL has a value of one. On the other hand, when it has been determined that the internal combustion engine is not stable, the flag F_STBL has a value of zero.

Suppose that it has been determined that the values of the rotational speed of the engine, the opening level of the throttle valve, and the negative pressure of the intake pipe are included within the predetermined range. In this case, it is determined whether the absolute value of the difference between the second previous rotational speed Ne3 of the engine and the current rotational speed Ne1 of the engine is less than a predetermined rotational speed, for example, 20 rpm (step S94). When it has been determined that the absolute value of the difference between the Ne3 and Ne1 is equal to or greater than the predetermined rotational speed, the variable STBL_CNT is set to a value of zero (step S92), the flag F_STBL is set to a value of zero (step S93), and this subroutine is terminated.

Suppose that it has been determined in step S94 that the absolute value of the difference between the Ne3 and Ne1 is less than the predetermined rotational speed. In this case, it is determined whether the absolute value of the difference between the second previous throttle-valve opening level TH3 and the current throttle valve opening level TH1 is less than a predetermined opening level, for example, 0.1 degrees (step S95). When it has been determined that the absolute value of the difference between the TH3 and TH1 is equal to or greater than the predetermined opening level, the aforementioned processing of the steps S92 and S93 is executed and then this subroutine is terminated.

Suppose that it has been determined in step S95 that the absolute value of the difference between the TH3 and TH1 is less than the predetermined opening level. In this case, it is determined whether the absolute value of the difference between the second previous intake pipe negative pressure PB3 and the current intake pipe negative pressure PB1 is less than a predetermined opening level, for example, 20 mmHg (step S96). When it has been determined that the absolute value of the difference between the PB3 and PB1 is equal to or greater than the predetermined value, the aforementioned processing of the steps S92 and S93 is executed and then this subroutine is terminated. As shown in FIG. 5, the negative pressure of the intake pipe of a single cylinder internal combustion engine varies in accordance with the cycle of the internal combustion engine. On the other hand, this subroutine is to be executed in step S62 of the subroutine for determining an engine stroke shown in FIG. 9. The subroutine for determining an engine stroke is to be executed when it has been determined that the stage number is 14, as shown in steps S28 and S30 of the interrupt processing subroutine shown in FIG. 3. The negative pressure of the intake pipe is detected in a predetermined cycle of the internal combustion engine, thereby making it possible to determine the stability of the internal combustion engine in accordance with the value of the negative pressure of the intake pipe.

When it has been determined in step S96 that the absolute value of the difference between the PB3 and PB1 is less than the predetermined value, the variable STBL_CNT is increased by one (step S97) and then it is determined whether the variable STBL_CNT is greater than two (step S98). When it has been determined that the variable STBL_CNT is less than the predetermined number of times, for example, two times, the processing of the aforementioned steps S93 is performed and then this subroutine is terminated. On the other hand, when it has been determined that the variable STBL_CNT is greater than two, the flag F_STBL is set to a value of one (step S99) and then this subroutine is terminated.

With the aforementioned arrangement, it is determined whether the difference between the second previously detected rotational speed of the engine and the currently detected rotational speed of the engine and the difference between the second previously detected throttle valve opening level and the currently detected throttle valve opening level are each included within the predetermined range. When it has been determined that the number of times at which these parameters are determined to be included within the predetermined range is equal to or greater than the predetermined number of times, it is determined that the internal combustion engine is in a stable state.

In the embodiment described above, it is assumed that the equal angle interval of a plurality of detected elements or the magnetic projections is 20 degrees and the angle interval in the non-formed region is 80 degrees. It is also acceptable that the equal angle interval or the angle interval in the non-formed region may employ other angle intervals to provide the magnetic projections and the non-formed region.

As described above, the stroke discriminator of the internal combustion engine according to the present invention makes it possible to quickly identify the stroke of an internal combustion engine with a simple configuration.

What is claimed is:
1. A stroke discriminator for an internal combustion engine comprising
a rotor operatively associated with a crankshaft of a single cylinder internal combustion engine and provided with a plurality of detectable elements thereon, detector means for transmitting a detection signal every time said detectable elements pass the detector means, and discriminator means for determining a stroke of the internal combustion engine in accordance with a difference in time between a transmission of a previous detection signal and transmission of a current detection signal, wherein an outer periphery of said rotor is provided with a detectable-element formed region having said plurality of detectable elements formed thereon at equal angle intervals in a direction of rotation and a non-formed region having no detectable elements formed thereon, and said non-formed region has an angle interval greater than said equal angle interval, and said non-formed region is provided on said rotor so as to pass near said detector means when a piston of said internal combustion engine travels from a top dead center position to a bottom dead center position.

2. The stroke discriminator for an internal combustion engine according to claim 1, wherein said discriminator means calculate a difference in time between a time at which one of two neighboring detectable elements, sandwiching said non-formed region passes the detector means and a time at which the other of said two detectable elements passes the detector means, and an expansion stroke discriminator means is provided for determining that a stroke of said internal combustion engine is an expansion stroke when a difference in time given by said non-formed region currently passing near the detector means is less than a difference in time given by said non-formed region previously passing near the detector means.

3. The stroke discriminator of an internal combustion engine according to claim 1, wherein said discriminator means include expansion stroke discriminator means for calculating a first difference in time between a time at which a first detectable element of two or more detectable elements passing near the detector means and a time at which the second detectable element of said two or more detected elements passes the detector means when said piston approaches from said bottom dead center position to said top dead center position;

for calculating a second difference in time between a time at which any one of two neighboring detectable elements, sandwiching said non-formed region, passes near the detector means after said first detectable element and said second detectable element have passed the detector means and a time at which the detectable element adjacent to said one detectable element at said equal angle interval passes near the detector means, and, for determining that the stroke of said internal combustion engine is an expansion stroke when a ratio of said second difference in time to said first difference in time is greater than a predetermined value.

* * * * *